J. B. F. HERRESHOFF.
APPARATUS FOR PURIFYING BURNER GASES.
APPLICATION FILED APR. 5, 1907.
940,596.
Patented Nov. 16, 1909.
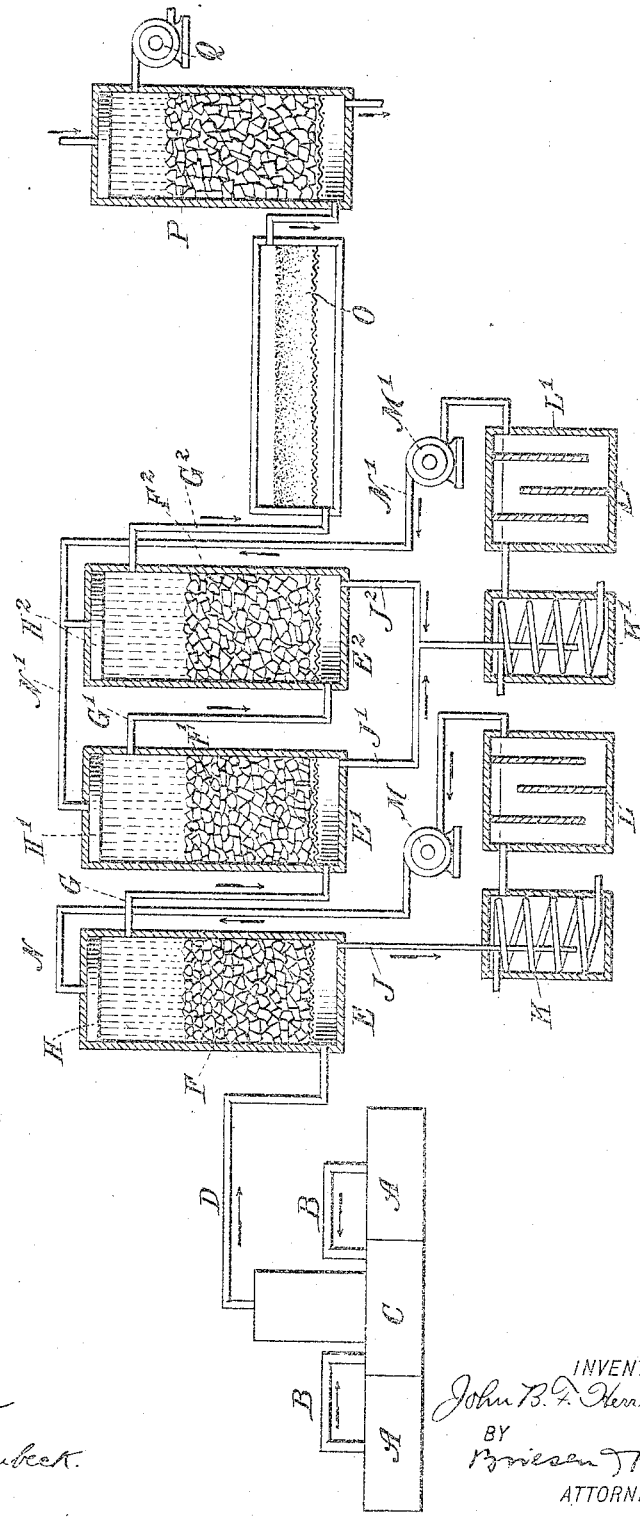
WITNESSES
INVENTOR
John B. F. Herreshoff
BY
ATTORNEYS

UNITED STATES PATENT OFFICE.

JOHN B. F. HERRESHOFF, OF NEW YORK, N. Y., ASSIGNOR TO GENERAL CHEMICAL COMPANY, OF NEW YORK, N. Y., A CORPORATION OF NEW YORK.

APPARATUS FOR PURIFYING BURNER-GASES.

940,596.  Specification of Letters Patent.  Patented Nov. 16, 1909.

Original application filed February 10, 1906, Serial No. 300,364. Divided and this application filed April 5, 1907. Serial No. 366,514.

*To all whom it may concern:*

Be it known that I, JOHN BROWN FRANCIS HERRESHOFF, a citizen of the United States, and resident of the borough of Manhattan, city, county, and State of New York, have invented certain new and useful Improvements in Apparatus for Purifying Burner-Gases, of which the following is a specification.

My invention relates to apparatus for the purification of burner gases such as are produced from sulfid ores and other materials used in the manufacture of sulfuric acid, and especially for effecting a purification which will render such gases suitable for the manufacture of sulfuric anhydrid and of sulfuric acid by the so-called contact process in which the sulfur dioxid contained in such gases is caused to combine with oxygen by the catalytic action of platinum or equivalent material.

The continued efficiency of the contact process for the manufacture of sulfuric anhydrid depends among other things upon the proper purification of the burner gases before they are allowed to enter the contact chamber. It has been found that the purification preceding the catalytic process should be so conducted as to remove certain detrimental impurities among which I will name particularly sulfuric acid (present in the form of mist) sulfur, arsenic, antimony, selenium, tellurium and hydrofluoric acid. The failure to eliminate these bodies before the catalytic reaction occurs will materially reduce the efficiency of the contact process, such bodies acting, as it were, as a poison by diminishing or destroying the catalytic activity of the platinum. On the other hand, nitrogen, which is a substitute of the burner gas mixture and which does not enter into the reaction, may be carried along with the purified gases without any detrimental effect on the contact process.

Reference is to be had to the accompanying drawing, which is a diagrammatic view, partly in section, of an apparatus embodying my invention.

A designates furnaces where the ore is roasted. The furnace gases or burner gases pass through conduits B into a dust chamber C of a cross section considerably greater than that of the conduits B, so that the gases will move more slowly in the dust chamber C, allowing the suspended solid particles to settle out therein. From this chamber C the gases pass through another conduit D to the cooling and scrubbing tower E, the path of the gases to said tower being such that their temperature is reduced to about 650° F. at their entrance into the tower. The gases pass upward in the tower E which contains a filling F of quartz stones or other suitable material, and a large quantity of a purifying liquid, preferably cool weak sulfuric acid (for instance of 40° Bé.) trickles downward over the filling. This treatment with finely divided cool weak sulfuric acid has a double effect, one of which is to further cool the gases, and the other to scrub them. The chief constituents of the burner gases are $SO_2$, O, and N. The gases also contain various liquid and solid impurities, and the settling and scrubbing system has to be so designed that it will eliminate with practical completeness all of the solid impurities. The sulfur, like solid (sublimed) arsenic, has a very detrimental influence on the activity of the contact substance.

The liquid impurities such as dissolved arsenic occur in the sulfuric acid, which is always formed when roasting sulfids and which in the gases is present in the nature of a mist, and it has been found that if such sulfuric acid is carried along through the remainder of the purifying process it seriously interferes with the efficiency of said process, requiring a very thorough and more lengthy purification than is necessary otherwise. Furthermore, the presence of sulfuric acid in the contact chambers interferes with the efficiency of the catalytic action. The arsenic, (as well as HFl and Se) is also dangerous to the catalytic activity of the platinum, and must be removed before the gases enter the contact chamber, or such arsenic will soon diminish the activity of the contact mass to a very material extent.

The preliminary cooling of the gases on their way to the cooling and scrubbing tower E is of assistance, as it enables the gases to be purified more readily when they come in contact with the weak acid trickling down in said tower. In the scrubbing tower the purification of the burner gases from S, $H_2SO_4$, As, and other detrimental impurities is carried on very efficiently owing to the large surface and to the intimate contact of the gases with the liquid which is brought about by the fine division of the weak acid.

If desired, and I consider this preferable, the gases may be passed in succession through several scrubbing towers. Thus, the drawing shows two additional scrubbing towers E', E², with fillings F', F² of the same character as hereinbefore described. Pipes G, G' connect the upper portion of one tower with the lower portion of the next and serve to convey the gases. The spray heads for supplying the weak acid are indicated at H, H', H², and the outlets for the weak acid at J, J', J². I prefer to use the same body of acid over and over again, and for this purpose, the acid from the outlet J passes into a cooler K and then through a settling box L having baffle-boards or other means for causing impurities to be thrown down. A pump M returns the cooled and purified acid through a pipe N to the spray head H. The acid from the towers E', E² is preferably led to the same cooler K', then to the settling box L', and finally brought back to the spray heads H', H², through the pipe N', by the pump M'. The cooling of the acid is required because it becomes heated in the scrubbing towers, and on the other hand the acid should be cool to perform its work efficiently. Some $SO_2$ is of course absorbed by the weak acid, but the acid soon becomes saturated with that amount of $SO_2$, which it can absorb at the temperature to which it is heated in the scrubbing towers. The cool acid does indeed absorb an additional amount of $SO_2$, but as the acid becomes heated, this additional amount is liberated in the scrubbing towers and passes along with the gases. The towers E, E', E², as well as the coolers K, K', and settling boxes L, L', should be closed to the atmosphere so as to prevent the escape of any $SO_2$ which may be liberated in any one of these apparatus.

The purification in the scrubbing towers should be so thorough that the solid impurities will be practically eliminated and will not perceptibly affect the operation of the remainder of the apparatus. The gases thus deprived of the solid impurities of a portion of the liquid mist, and of gaseous impurities as well, pass through the conduit G² to the filter C, preferably filled with fine, dry sand coke or other medium, therefore it is very important that no solid matter should be permitted to enter the filter. The filter is of great area and depth. In this filter, the acid mist containing As, and most of the moisture, are removed from the gases and the purification is completed. Finally, the gases are dried in a drying tower P by contact with concentrated sulfuric acid trickling down in the usual way. A blower Q or other suitable device is employed for causing the gases to follow the path set forth. The purified gases pass on to the contact chamber or other apparatus.

The treatment hereinbefore described removes the $H_2SO_4$, S, HFl, As, and other detrimental impurities from the burner gases but leaves the contents of $SO_2$ and of other constituents, that is, chiefly C and N, practically unaltered. Those constituents therefore, $SO_2$ and O, which are the active constituents in the contact process and N which is inert, are preserved in their practical entirety, while the detrimental impurities are removed.

The gases, at the end of the purifying treatment herein described, should satisfy an optical test showing their practically absolute freedom from solid or liquid matter.

The present application is a division of an application filed by me in the United States Patent Office on February 10, 1906, Serial No. 300,364, in which the process herein described is claimed.

I claim:

1. The herein described gas purifying apparatus, comprising a scrubbing tower having a spray inlet at the top and a liquid outlet at the bottom and also an inlet and an outlet for the gases, a cooler for receiving the liquid from the outlet of the scrubbing tower, a purifying or settling chamber connected with the outlet of said cooler, means for circulating the spray liquid through the scrubbing tower, the cooler and the settler, and apparatus connected with the gas outlet of the scrubbing tower for further treating the gases.

2. The herein described gas purifying apparatus, comprising a scrubbing tower having a liquid inlet at the top, a liquid outlet at the bottom, a gas inlet at the bottom, and a gas outlet at the top, a cooler connected with the liquid outlet of the scrubbing tower, a settling chamber connected with the outlet of the cooler, means of conveying the liquid from the settling chamber to the liquid inlet of the scrubbing tower, the said scrubbing tower, as well as the cooler and the settling chamber, being closed to the atmosphere, and apparatus connected with the gas outlet of the scrubbing tower, for further treating the gases.

In testimony whereof, I have hereunto set my name, in the presence of two subscribing witnesses.

JOHN B. F. HERRESHOFF.

Witnesses:
JOHN LOTKA,
JOHN A. KEHLENBECK.